United States Patent [19]

Brickner

[11] Patent Number: 4,815,900

[45] Date of Patent: Mar. 28, 1989

[54] METHOD FOR CUTTING SLOT IN A HEAD FORM

[76] Inventor: Donald J. Brickner, 4306 Scott Rd., East Springfield, Pa. 16411

[21] Appl. No.: 111,173

[22] Filed: Oct. 22, 1987

[51] Int. Cl.[4] .......................... B23C 3/28; G09B 23/00
[52] U.S. Cl. ..................................... 409/132; 434/296
[58] Field of Search ................ 409/132, 131; 434/296, 434/295; 29/558, 557, 1.32, 91.5, 91.1

[56] References Cited

U.S. PATENT DOCUMENTS 2,075,219  3/1937  Naulty .................................. 434/296

FOREIGN PATENT DOCUMENTS 4513650  5/1970  Japan .................................... 434/296

Primary Examiner—William Briggs
Attorney, Agent, or Firm—Ralph Hammar

[57] ABSTRACT

A method of use of a rotary tool for forming the skin receiving groove at the lip line of an animal head form. The tool produces a narrow slot at the junction line of the upper and lower lips with an enlargement below the slot and with round holes at the rear corners or junctions between the upper and lower lips.

6 Claims, 1 Drawing Sheet

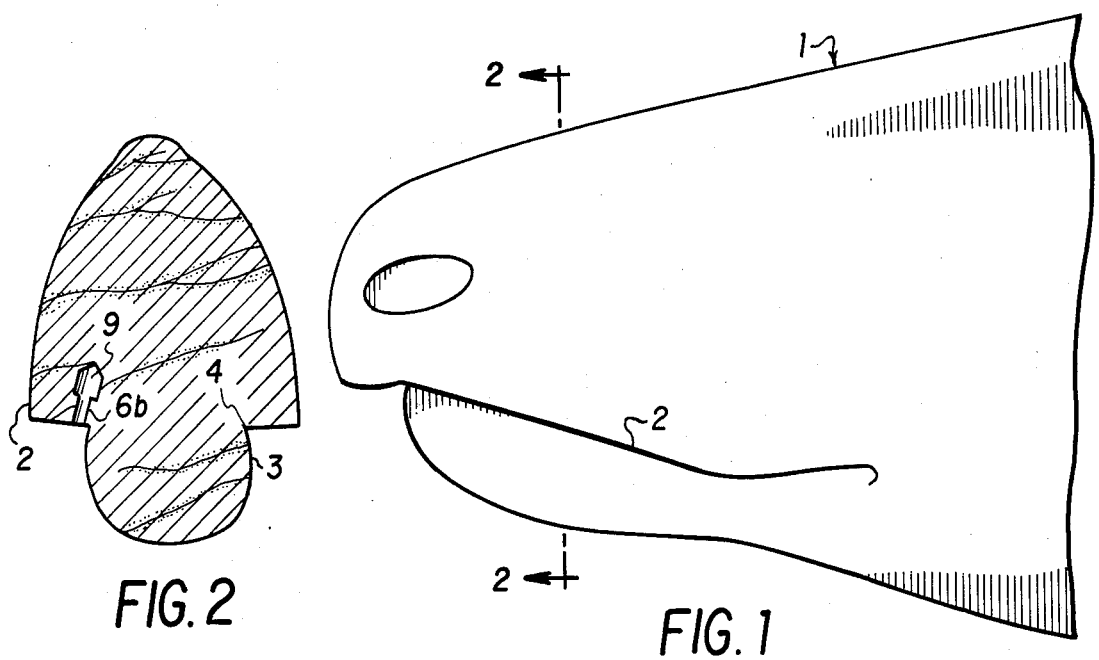
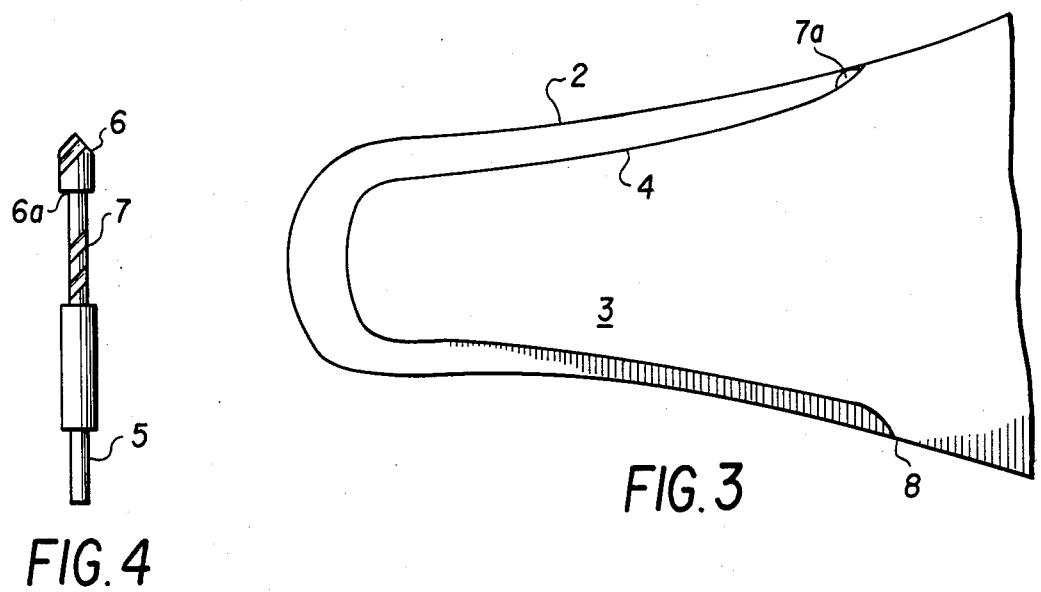

METHOD FOR CUTTING SLOT IN A HEAD FORM

In taxidermy, the skin is stretched over a headform of polystyrene foam or other suitable material and at the lip line, the junction between the upper and lower lips, the skin has heretofore been tucked into a groove formed manually by a tedious and time-consuming process.

This invention produces a better lip line groove in much less time and at much lower cost.

In the drawing,

FIG. 1 is a side elevation of the snout of a deerhead form.

FIG. 2 is a section on line 2—2 of FIG. 1, the right side showing the form before the forming of the lip groove and the left side showing the form after formation of the lip groove.

FIG. 3 is a bottom view of FIG. 1.

FIG. 4 is an elevation of the lip groove forming tool.

In the drawing, 1 indicates the snout of a form from a deerhead, one of the forms used by taxidermists. The form is made of a rigid polystyrene foam or other suitable material. In the drawing, 2 indicates the upper lip and 3 indicates the lower lip. The upper lip overhangs the lower lip as shown in FIG. 2. The skin is stretched over the form and at the lip line 4, the junction between the upper and lower lips, a groove has heretofore been dug into the form by hand so that the skin could be forced into the groove and form a natural appearing junction between the upper and lower lips. The formation of the lip line groove has been a tedious and time-consuming job.

The tool shown in FIG. 4 eliminates the hand work and produces a consistently better job. This tool has a shank 5, one end of which may be received in any power driven chuck such as the chuck of a hand electric drill and the other end of which has an enlarged head 6 for forming the bottom of the lip line groove and a reduced diameter section 7 for forming the remainder of the lip line groove. Both portions 6 and 7 have suitable cutting edges, for example, the helical cutting edges used in twist drills. An abrupt shoulder 6a on the head 6 provides a sharp edged shoulder 6b between the wide groove section formed by the head 6 and the narrower groove section formed by the reduced diameter section 7. Polystyrene foam is very easily cut so that many cutting edges or formations may be used.

In the use of the tool, after mounting in a chuck, the enlarged end 6 is plunged into a rear corner 8 or junction of the upper and lower lips. The initial plunge forms a round hole 7a of diameter equal to the diameter of the enlarged head 6 of the tool. The tool is then moved along the junction line 4 between the upper and lower lips while maintaining the head 6 at least an eighth of an inch below the junction line. Upon reaching the other corner 8 or junction of the upper and lower lips, the tool is withdrawn forming a round hole at the exit. The tool provides an accurately formed groove for receiving the edges of the skin which are tucked into the groove with the excess spreading out into the enlargement 9 produced by the head 6. At the corners 8 the skin is tucked into the round holes 7a and pinned in place.

I claim:

1. The method of forming the lip line groove in a taxidermist's head form of polystyrene foam or other suitable material, the head form having a junction line between the upper and lower lips and rear corners or junctions between the upper and lower lips, the tool having a shank which may be received in any power driven chuck, said shank having first cutting edges forming a groove or slot of the desired width and an enlarged head or tip with second cutting edges forming a wider groove or enlargement below the groove or slot formed by said first edges and forming round holes adjoining said slot and wider groove as said tool is plunged into the head at one corner and withdrawn from said head at the other corner, the method comprising the steps of plunging the tool into one of said rear corners to form a round hole of diameter corresponding to the enlarged head, moving the tool along junction line while maintaining the said head the desired distance below said junction line and withdrawing the tool at the other of said corners thereby producing an accurately formed groove for receiving the edges of the skin which are tucked into the slot with the excess spreading out in the enlargement produced by the enlarged head and further producing round holes at the corners into which skin is tucked and fastened in place.

2. The method of forming the lip line groove in a taxidermist's head form of polystyrene foam or other suitable material, the head form having a junction line between the upper and lower lips and rear corners or junctions between the upper and lower lips, the tool having a shank which may be received in any power driven chuck, said shank having first cutting edges forming a groove or slot of the desired width and a head or tip with second cutting edges forming a groove below the groove or slot formed by said first edges, said tool forming round holes adjoining said slot as said tool is plunged into the head at one corner and withdrawn from said head at the other corner, the method comprising the steps of plunging the tool into one of said rear corners to form a round hole, moving the tool along said junction line while maintaining the said head the desired distance below said junction line and withdrawing the tool at the other of said corners thereby producing an accurately formed groove for receiving the edges of the skin which are tucked into the slot and further producing round holes at the corners into which skin is tucked and fastened in place.

3. The method of forming the lip line groove in a taxidermist's head form of polystyrene foam or other suitable material, the head form having a junction line between the upper and lower lips and rear corners or junctions between the upper and lower lips, the tool having a shank which may be received in any power driven chuck, said shank having first cutting edges forming a groove or slot of the desired width and a head or tip with second cutting edges forming a groove below the groove or slot formed by said first edges, said tool forming a round hole adjoining said slot as said tool is plunged into the head at one corner, the method comprising the steps of plunging the tool into one of said rear corners to form a round hole, moving the tool along said junction line while maintaining the said head the desired distance below said junction line and withdrawing the tool at said one corner thereby producing an accurately formed groove for receiving the edges of the skin which are tucked into the slot and further producing a round hole at said one corner into which skin is tucked and fastened in place.

4. The taxidermist's head form made by the method of claim 1.

5. The taxidermist's head form made by the method of claim 2.

6. The taxidermist's head form made by the method of claim 3.

* * * * *